United States Patent [19]

Shibahata

[11] Patent Number: 4,545,602

[45] Date of Patent: Oct. 8, 1985

[54] INDEPENDENT REAR SUSPENSION SYSTEM FOR AUTOMOTIVE VEHICLE

[75] Inventor: Yasuji Shibahata, Yokohama, Japan

[73] Assignee: Nissan Motor Co., Ltd., Japan

[21] Appl. No.: 639,487

[22] Filed: Aug. 10, 1984

[30] Foreign Application Priority Data

Oct. 27, 1983 [JP] Japan .................... 58-201284

[51] Int. Cl.⁴ .............................. B60G 3/00
[52] U.S. Cl. ......................... 280/701; 180/140; 280/91; 280/675; 280/696
[58] Field of Search ............ 280/91, 93, 96.1, 660, 280/673, 675, 688, 690, 691, 696; 180/140

[56] References Cited

U.S. PATENT DOCUMENTS

| | | | |
|---|---|---|---|
| 3,871,467 | 3/1975 | Senft et al. | 280/701 |
| 4,046,403 | 9/1977 | Yoshida | 280/701 |
| 4,245,853 | 1/1981 | Inoue et al. | 280/701 |
| 4,440,254 | 4/1984 | Shibahata et al. | 180/140 |
| 4,457,537 | 7/1984 | von der Ohe et al. | 280/675 |
| 4,478,430 | 10/1984 | Maebayashi et al. | 280/690 |

FOREIGN PATENT DOCUMENTS 55-147968 10/1980 Japan .
1393187 5/1975 United Kingdom .
2036241 6/1980 United Kingdom .

OTHER PUBLICATIONS

Nissan Service Periodical 491 (BL-14) p. -III-31.

Primary Examiner—Joseph F. Peters, Jr.
Assistant Examiner—Kenneth R. Rice
Attorney, Agent, or Firm—Leydig, Voit & Mayer

[57] ABSTRACT

An independent rear suspension system according to the invention comprises two parallel lateral links having outboard ends mounted via respective elastic bushes on a wheel support carrying a road wheel and inboard ends mounted via respective elastic bushes on a vehicle body. The inboard end of the front lateral link is mounted about an inclined pivot axis. This pivot axis is so inclined from the vehicle longitudinal axis as to provide an arrangement whereby when a force is applied to a portion of the front lateral link near the inboard end thereof in a direction along the inclined pivot axis, the front lateral link moves transversely with respect to the longitudinal axis of the vehicle further than the rear lateral link does, causing a toe angle of the road wheel to vary.

13 Claims, 11 Drawing Figures

INDEPENDENT REAR SUSPENSION SYSTEM FOR AUTOMOTIVE VEHICLE

BACKGROUND OF THE INVENTION

The present invention relates to an independent rear suspension system for an automotive vehicle, and more particularly to an independent rear suspension system which is so designed as to ensure stability and control of the automotive vehicle.

As shown in FIG. 1, a conventional independent suspension for a rear left wheel of a FF (Front Engine Front Drive) automotive vehicle comprises a strut 2 extending upwards from a rear left wheel 7, a radius rod 3 extending forward from the rear wheel 7, and a pair of parallel lateral links 4, 5 extending transversely inboards of the vehicle from the rear wheel 7. The strut 2 has an upper end pivotably mounted on the vehicle body and a lower end securely connected to a wheel support 8 having a spindle 9 for the rear wheel 7.

The conventional independent suspension as described above suffers from a drawback that each of the rear wheels is inclined toward a toe-out side when the rear wheel is subjected to a load F when the vehicle is being braked, and thus the vehicle loses control when making a turn under this condition.

This inclination of the rear wheels takes place owing to compliance steer of the suspension.

One known approach to solve the above mentioned problem is to steer the rear wheels in order to compensate for compliance steer phenomenon.

Japanese Utility Model Application Provisional Publication No. 55-147968 discloses a rear wheel steering arrangement designed to compensate for the compliance steer. FIG. 2 illustrates in diagram a portion of this known arrangement. Referring to FIG. 2, rear wheels 10 are supported on axle shafts integral with left and right knuckle arms 14d, 14b which are mounted by king pins 14e, 14f to a suspension beam 14a. The knuckle arms 14d, 14b are interconnected by a tie rod 14c as shown. A servo cylinder 20 has a piston rod 20c operatively connected to the knuckle arm 14d. The servo cylinder 20 has two chambers 20a, 20b which are connected to a control valve (not shown). The control valve is operative responsive to lateral acceleration and selectively pressurizes the chambers 20a, 20b so as to steer the rear wheels 10 in the same direction as the front wheels (not shown) are steered.

This known steering arrangement is found to be effective in compensating for the compliance steer. However, since it requires king pins in mounting the wheels in a similar manner to the front wheels, this arrangement can not be embodied in an independent rear suspension of the type as shown in FIG. 1.

SUMMARY OF THE INVENTION

An object of the present invention is to improve an independent rear suspension system for an automotive vehicle such that a toe angle of each of rear road wheels of the automotive vehicle is allowed to vary depending upon operating condition of the automotive vehicle.

A specific object of the present invention is to provide an independent rear suspension system which allows each of rear wheels to tilt toward a toe-in side when the automotive vehicle is being braked.

Another specific object of the present invention is to provide an independent rear suspension system which allows each of rear road wheels to tilt in the same direction as front road wheels are steered.

According to the present invention, an independent rear suspension system for an automotive vehicle comprises two parallel lateral links having outboard ends mounted via respective elastic bushes on a wheel support carrying a road wheel and inboard ends mounted via respective elastic bushes on a vehicle body. One of the ends of the two lateral links is mounted about an inclined pivot axis. This pivot axis is so inclined from the vehicle longitudinal axis as to provide an arrangement whereby when a force is applied to a portion of the lateral link near the one end in a direction along the pivot axis, the lateral link moves transversely with respect to the longitudinal axis of the vehicle further than the other lateral link does, causing a toe angle of the road wheel to vary.

DESCRIPTION OF THE PREFERRED EMBODIMENTS

Figure 1:
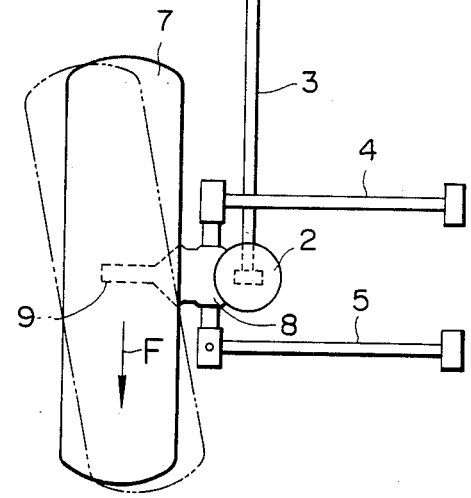
FIG. 1 is a schematic plan view the known independent rear suspension discussed as above.
Figure 2:
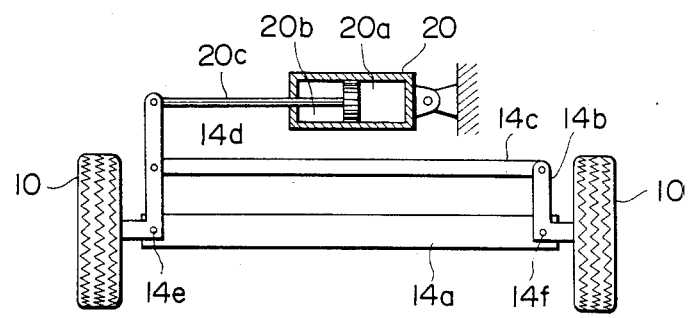
FIG. 2 is a schematic plan view of the known rear wheel steering arrangement discussed as above.
Figure 3:
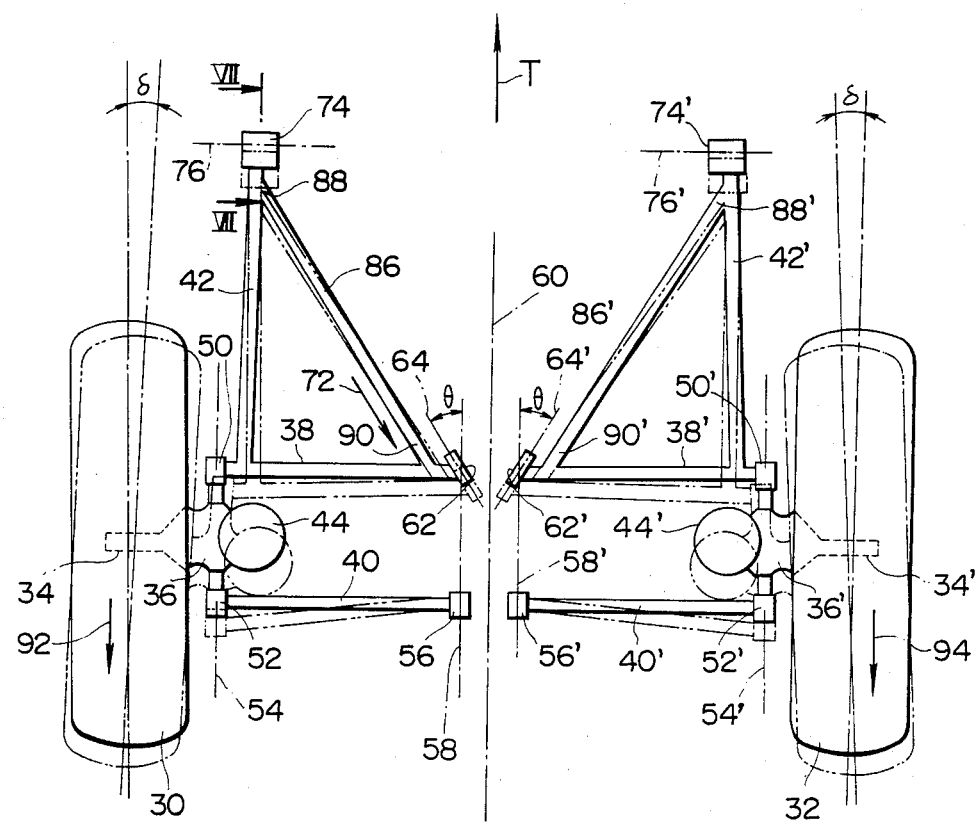
FIG. 3 is a schematic plan view of a first embodiment of an independent rear wheel suspension according to the present invention.
Figure 4:
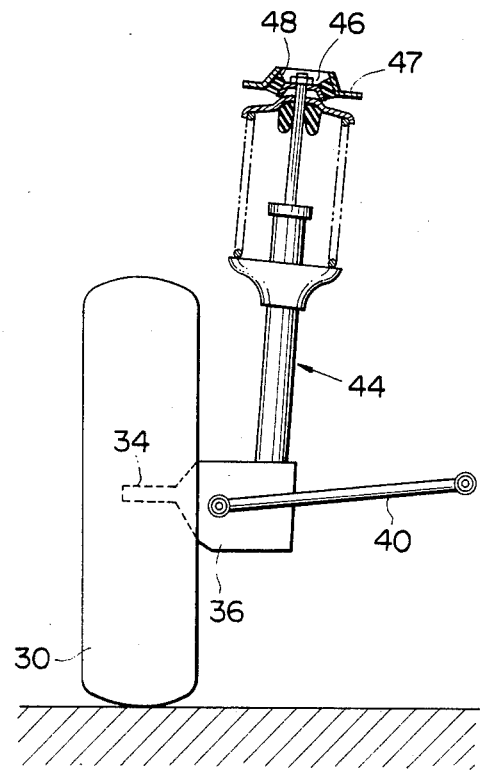
FIG. 4 is a frangmentary schematic elevational view of the suspension shown in FIG. 3.

Referring to FIGS. 3 to 7, and particularly to FIG. 3, an independent suspension for a rear left wheel 30 and a rear right wheel 32 is illustrated. The rear left wheel 30 is rotatably carried by a spindle 34 of a wheel support 36 which is connected to a vehicle body (not shown) via two parallel lateral links 38, 40, a radius rod 42, and a strut 44 in a conventional manner. As best seen in FIG. 4, the strut 44 is of a conventional shock absorbing type and extends in a direction which is generally verticle with respect to the vehicle. The strut 44 has a lower end connected to the wheel support 36 and an upper end portion 46 mounted to a portion 47 of the vehicle body via an elastomer 48, thus allowing pivotal movement of the strut 44 relative to the vehicle body. With the strut 44, a force transmitted vertically to the vehicle body from the wheel 30 is absorbed/damped.

Referring back to FIG. 3, the lateral link 38 is disposed forward of the other lateral link 40. Hereinafter, the lateral link 38 is called as a "front" lateral link and the other lateral link 40 is called as a "rear" lateral link. The front lateral link 38 has an outboard end 50 pivotably mounted via elastic bush on the wheel support 36 about a mounting bolt (not shown) securely connected to the wheel support 36, while the other lateral link 40 has an outboard end 52 thereof pivotably mounted via elastic bush on the wheel support 36 about the same mounting bolt. The two parallel lateral links 38 and 40, therefore, are pivotable about a predetermined pivot axis 54, i.e., a center of the mounting bolt. The lateral link 40 has an inboard end 56 pivotably mounted on a vehicle body, not shown, about a predetermined pivot axis 58 which lies substantially parallel to the vehicle longitudinal axis 60. The front link 38 has an inboard end 62 pivotably mounted via elastic bush on the vehicle body about a predetermined pivot axis 64 which is inclined by a predetermined angle theta ($\theta$) from the predetermined pivot axis 58, an axis parallel to the vehicle longitudinal axis 60.

Figure 5:
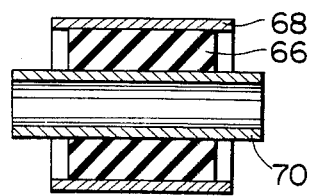
FIG. 5 is a longitudinal section of an elastic bush used for carrying each of outboard and inboard ends of parallel lateral links of the embodiment shown in FIG. 3.
Figure 6:
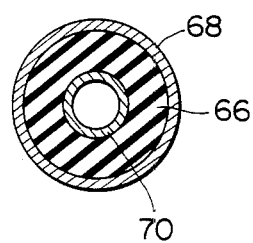
FIG. 6 is a cross section of the elastic bush shown in FIG. 5.

Each of the outboard ends 50, 52 and the inboard ends 62, 56 of the lateral links 38 and 40 is in the form of a collar serving as an outer casing of an elastic bush as shown in FIGS. 5 and 6. The elastic bush 66, as shown in FIGS. 5 and 6, is disposed between an outer collar 68 and a bolt or a rod 70. The axial displacement of the outer collar 68 relative to the rod 70 causes a shear deformation of the bush 66, while the radial displacement of the outer collar 68 relative to the bolt 70 causes a compression/extension deformation. The spring constant in the axial displacement direction is therefore smaller than the spring constant in the radial displacement direction. The predetermined axis about which the inboard end collar 62 of the front link 38 has a leading end and a trailing end, with respect to the forward travelling direction of the vehicle as indicated by an arrow T, which is disposed inboard of the leading end as shown in FIG. 3. The fact that the inboard end 62 of the front lateral link 38 is inclined provides arrangement whereby when a force as indicated by an arrow 72 is applied to that portion of the forward lateral link 38 which is disposed near the inboard end 62 of the forward link 62 in a direction along the pivot axis 64, the front lateral link 38 moves transversely with respect to the vehicle longitudinal axis 60 further than the rear lateral link 40 does, tilting the pivot aixs 54 clockwise as viewed in FIG. 3 from the vehicle longitudinal axis, assuming the position illustrated by phantom lines, thus varying a toe angle of the road wheel 30 by an angle delta ($\delta$) towards a toe-in side.

With these lateral links 38 and 40, a force transmitted traversely to the vehicle body from the raod wheel 30 is absorbed.

Figure 7:
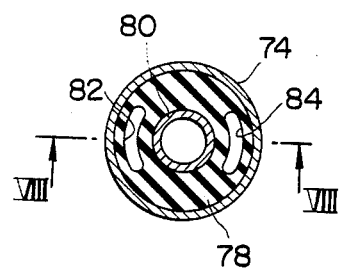
FIG. 7 is a longitudinal section of an elastic bush taken through line VII—VII in FIG. 3.
Figure 8:
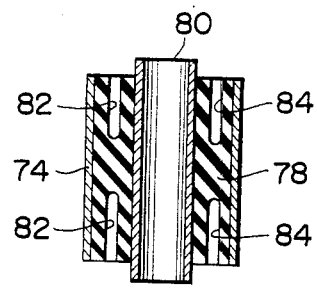
FIG. 8 is a cross section taken through line VIII—VIII in FIG. 7.

The radius rod 42 has a forward end 74 thereof pivotably mounted on the vehicle body about a predetermined pivot axis 76 which extends transversely with respect to the vehicle longitudinal axis 60. A rear end of the radius rod 42 is fixedly secured to a portion of the forward lateral link 38 near the outboard end 50 by means of bolts or via welding. The forward end 74 of the radius rod 42 is in the form of a collar serving as an outer casing of an elastic bush 78 as best seen in FIGS. 7 and 8. The elastic bush 78 is disposed between the collar 74 and a bolt 80. Referring to FIGS. 7 and 8, the elastic bush 78 is formed with arcuate grooves 82 and 84 which are diametrically opposed along the longitudinal axis of the radius rod 42. As seen in FIG. 8, the grooves 82 and 84 extend inwardly of the body of the bush 78. This bush 78 exibit a small spring constant in the longitudinal direction of the radius rod 42 as compared to the spring constant in the other directions because the bush 78 is easily deformed until the grooves are completely closed. Therefore, even if the rigidity of the bush 78 is set relatively high, this will not affect absorption of road shock in the longitudinal direction of the radius rod 42. This means that the rigidity of the bush 78 can be set high enough to provide increased stability. It will also be noted that since the arcuate grooves 82 and 84 extend inwardly, the radius rod 42 can move with the front lateral link 38 as the latter transversely moves.

For the purpose of applying the force 72, an auxiliary link 86 is provided. The auxiliary link 86 extends substantially parallel to the pivot axis 64 and has a forward end 88 thereof fixedly secured to a portion of the radius rod 42 near the forward end 74 of the latter and an opposite end 90 fixedly secured to a portion of the forward lateral link 38 near the inboard end 62.

The link mechanism for suspending the rear right wheel 32 is similar to the above described link mechanism for suspending the rear left wheel 30 in that the former is just a mirror image of the latter. Therefore, the like parts are designated by the same reference numerals used for designating the mechanism for the rear left wheel 30 but with a single prime (').

The rear suspension system thus far described works as follows:

During braking, the rear wheels 30 and 32 are subject to a load as indicated by arrows 92 and 94, moving the wheel supports 36 and 36' to the rear of the vehicle body, thus moving the outboard ends 50,52 and 50',52' to the rear. As described before, the auxiliary link 86, radius rod 42 and forward lateral link 38 form a rigid structure and the auxiliary link 86', radius rod 42 and forward lateral link 38' form a rigid structure, the force urging the outboard ends 50,52 and 50',52' to the rear is transmitted to the inboard ends 62 and 62' of the front lateral links 38 and 38', thus pushing the inboard ends 62 and 62' to the rear of the vehicle body. Because the elastic bushes that support the inboard ends 62 and 62' of the front lateral links 38 and 38' have a relatively small spring constant in the axial direction which is inclined from the vehicle longitudinal axis 60 by the angle theta ($\theta$), the inboard ends 62 and 62' move not only in the rear direction but also in transversely inboard direction, assuming positions as shown by phantom lines in FIG. 3. Thus, the forward lateral links 38 and 38' are displaced transversely and inboard further than the rear lateral links 40 and 40' are. This causes the outboard ends 50 and 50' of the front lateral links 38 and 38' to move further inboard as compared to the outboard ends 52 and 52' of the rear lateral links 40 and 40', thus allowing the pivot axes 54 and 54' to tilt. As a result, the toe angle of each of the rear road wheels 30 and 32 is varied and the road wheels 30 and 32 are inclined towards a toe-in side by an angle delta ($\delta$), allowing the rear road wheels 30 and 32 to establish a toe-in state. This ensures stability and control even if the vehicle is steered to make a turn during braking.

Figure 9:
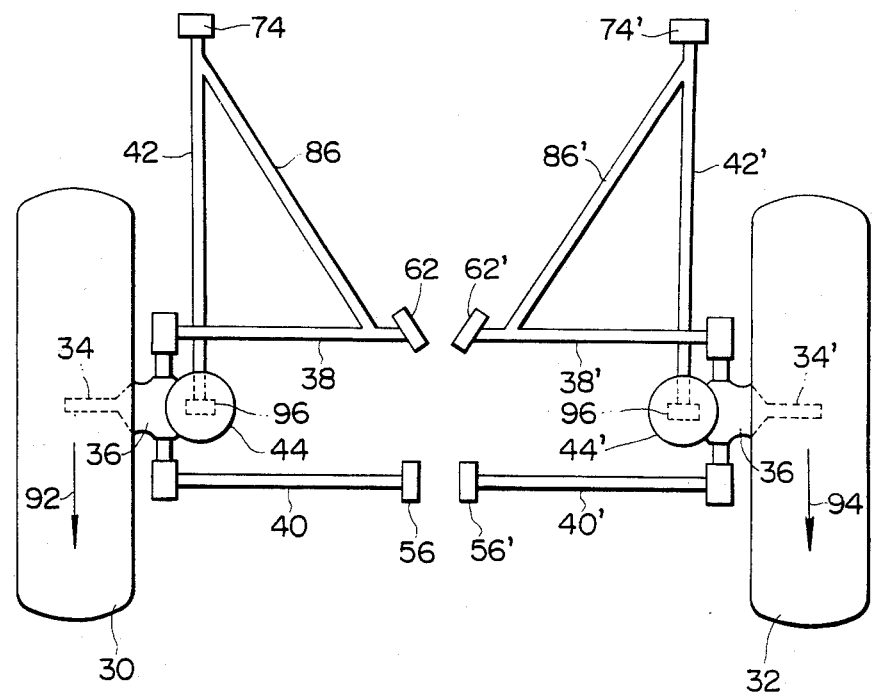
FIG. 9 is similar view to FIG. 3 showing a second embodiment according to the present invention.

Referring to FIG. 9, a second embodiment is described. This embodiment is substantially similar to the first embodiment except that radius rods 42 and 42' have their rear ends 96 and 96' pivotably mounted on lower portions of wheels supports 36 and 36', respectively, via respective elastic bushes (not shown). This embodiment works in the same manner as the first embodiment.

Figure 10:
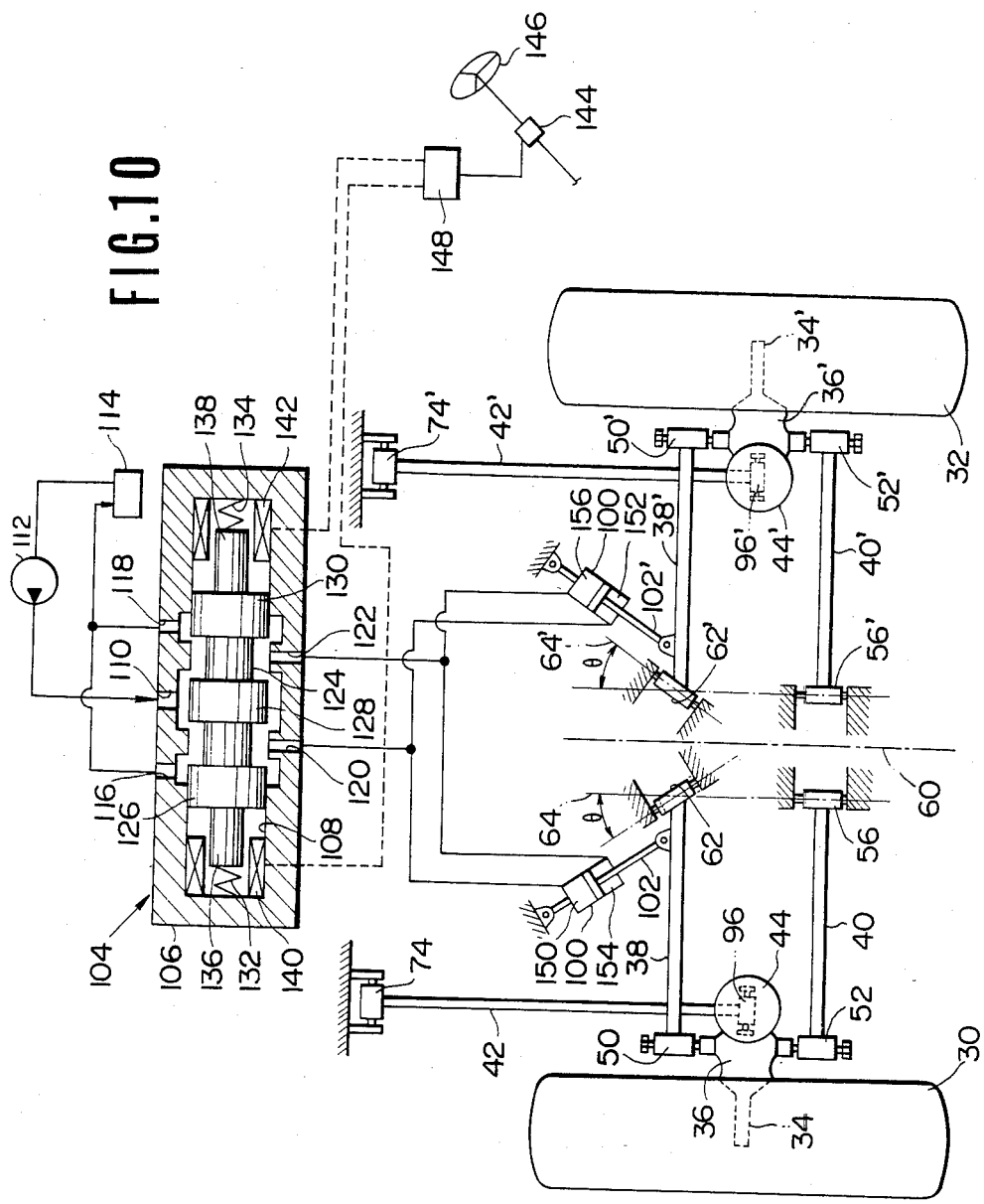
FIG. 10 is a schematic plan view of a third embodiment.

Referring to FIG. 10, a third embodiment is described. This embodiment is similar to the second embodiment but is different therfrom in that a hydraulic actuators 100 and 100' are used to apply forces to inboard ends 102 and 102' of front lateral links 38 and 38' rather than the auxiliary links 86 and 86'. The hydraulic actutor 100 has a piston rod 102 operatively connected to a portion of the front lateral link 38 near the inboard end 62 thereof and extends along a pivot axis 64 so that then the actuator 100 is extended, the inboard end 62 of the front lateral link 38 moves to the rear and inboards along the pivot axis 64 and when the actuator 100 is contracted, the inboard end 62 of the front lateral link 38 moves forwards and outboards along the pivot axis 64. Similarly, the actuator 100' has a piston rod 102' operatively connected to a portion of the front lateral link 38' near the inboard end 62' thereof and extending along the pivot axis 64' such that when the actuator 100' is extended, the inboard end 62' of the front lateral link 38' moves to the rear and inboards along the pivot axis 64', and when it is contracted, the inboard end 62' moves forwards and outboards along the pivot axis 64.

The supply of fluid to the hydraulic actuators 100 and 100' and discharge therefrom are controlled by a control valve 104 which includes a housing 106 formed with a bore 108. Formed also in the housing 106 are an inlet port 110 communicating with discharge side of a fluid pump 112 adapted to suck in oil from a fluid reservoir 114 and discharge fluid under pressure to the inlet port 110, two drain ports 116 and 118, and two outlet ports 120 and 122. Slidably situated in the bore 108 is a spool 124 formed with three axially spaced control lands 126, 128 and 130. The drain port 116, outlet port 120, inlet port 110, outlet port 122 and drain port 118 are arranged in this order from left to right, as viewed in FIG. 10 and opening into the bore 108. Arranged on the both sides of the spool 124 are springs 132 and 134. The spool 124 has solenoid core plunger ends 136 and 138 which cooperate with solenoids 140 and 142, respectively. The solenoids 136 and 138 are selectively supplied with electric current having an amount proportional to a steering angle as detected by a steering angle sensor 144 attached to a steering wheel 146 which is operatively connected to front road wheels (not shown) for steering same. When the steering wheel 146 is turned for making a turn to the right, electric current having an amount proportional to the steered angle detected by the sensor 144 is supplied via an amplifier 148 to the solenoid 140, whereas, the electric current having an amount proportional to the steering angle is supplied to the solenoid 142 when the steering wheel 146 is turned for making a turn to the left. The outlet port 120 is connected to a chamber 150 of the actuator 100 and a chamber 152 of the actuator 100', while the outlet port 122 is connected to a chamber 154 of the actuator 100 and a chamber 156 of the actuator 100'.

The rear suspension system shown in FIG. 10 works as follows:

Let it be assumed that a driver turns the steering wheel 146 clockwise so as to turn the vehicle to the right. The steering angle sensor 144 detects an angle through which the steering wheel 146 has been turned and electric current proportional to the detected steering angle is supplied via the amplifier 148 to the solenoid 140. Energization of the solenoid 140 causes the spool 124 to move to the right as viewed in FIG. 10 by an amount proportional to the amount of electric current passing through the solenoid 140. With the spool 124 so positioned, fluid communication of the inlet port 110 with the outlet port 120 is established and the other outlet port 122 is drained, fluid under pressure is supplied to the chamber 150 of the actuator 100 and the chamber 154 of the actuator 100', while the other chambers 152 and 156 of the actuators 100 and 100' are drained. Thus, the actuator 100 is extended, while the actuator 100' is contracted. The extending movement of the actuator 100 causes the inboard end 62 of the front lateral link 38 to move to the rear and inboards, bringing about a transverse movement of the front lateral link 38 due to the fact that the inboard end 62 serving as a casing of elastic bush is inclined by an angle theta ($\theta$) from the vehicle longitudinal axis 60. The trasverse movement of the rear lateral link 40, however, is suppressed by the elastic bushes supporting the outboard end 52 and inboard end 56 thereof due to its relatively hard elasticity in radial displacement direction. Further, the elastic bush allows tilting movement of the radius rod 42 with the plane of where the radius rod 42 lies because of arcuate grooves 82 and 84 as best seen in FIG. 8. As a result, the pivot axis 54 stationary relative to the wheel support 36 is inclined toward a toe-in side. Contracting the actuator 100' causes the inboard end 62' of the front lateral link 38' to move forwards and outboards, bringing about a transverse movement of the front lateral link 38 in the outboard direction. As a result, the rear right wheel 32 is inclined toward toe-out side. Therefore, the rear wheels 30 and 32 are steered to the right by an amount proportional to the steering angle when the steering wheel 146 is turned clockwise in steering the front wheels (not shown) to the right, providing under steer characteristic, thus ensuring that the vehicle can make a right turn at high speeds because a rapid change in yawing rate is suppressed due to under steer characteristic.

When the steering wheel 146 is turned counterclockwise to make a left turn, the inlet port 110 is allowed to communicate via the outlet port 122 with the chamber 152 of the actuator 100 and the chamber 156 of the actuator 100', while the other chambers 150 and 154 are drained via the outlet port 120. Thus, the actuator 100 is contracted and the actuator 100' is extended. As a result, the rear wheels 30 and 32 are steered to the left. Thus, it is ensured that the vehicle can make left turn at high speeds.

When the vehicle is travelling straight and forward, the spool 124 assumes a neutral position as illustrated in FIG. 10 because no current is supplied to the solenoids 140 and 142. In the illustrated neutral position of the spool 124, all of the chambers 150, 152, 154 and 156 are drained, thus rendering the actuators 100 and 100' inoperable. This means that the actuators 100 and 100' do not affect the motion of the lateral links 38, 38', 40, 40', radius rod 42, 42'. As a result, good stability in forward travel is ensured.

Figure 11:
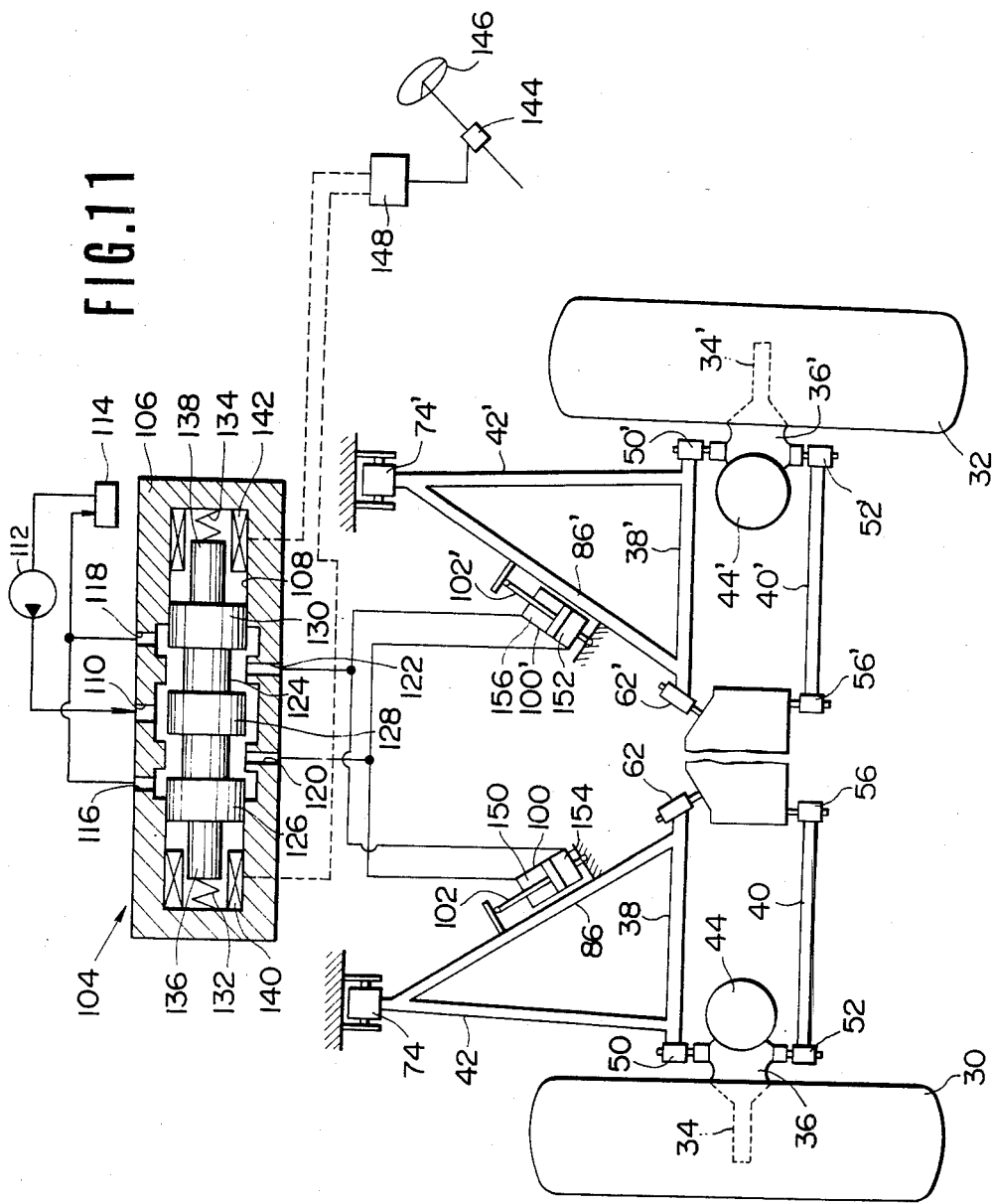
FIG. 11 is a similar view to FIG. 10 showing a fourth embodiment.

Referring to FIG. 11, a fourth embodiment is described. This embodiment is substantially similar to the third embodiment but is different from the latter in that rearward ends of radius rods 42, 42' are integrally connected to portions of front lateral links 38, 38' near outboard ends 50, 50' thereof and auxiliary links 86, 86' are interconnected between forward end portions of the radius rods and portions of the front lateral links 38, 38' near the inboard ends 62, 62' thereof in a similar manner to the first embodiment shown in FIG. 3 and hydraulic actuators 100 and 100' are operatively connected to the auxiliary links 86, 86'. As shown, the hydraulic actuators 100 and 100' are fixedly mounted on a vehicle body with their piston rods 102 and 102' operatively connected to the corresponding auxiliary links 86 and 86'. The piston rods 102 and 102' are arranged to extend in parallel to the auxiliary links 86 and 86'.

This suspension system works in subantially the same manner as the third embodiment.

What is claimed is:

1. An independent suspension system for a vehicle having a vehicle body with a vehicle longitudinal axis and a road wheel, comprising:
    a wheel support rotatably carrying the road wheel;
    a first lateral link having one end pivotably mounted via an elastic bush on said wheel support about a first predetermined pivot axis which lies substantially in parallel to the vehicle longitudinal axis;
    a second lateral link having one end pivotably mounted via an elastic bush on said wheel support about said first predetermined pivot axis; said second lateral link extending in parallel to said first lateral link,
    said first lateral link having an opposite end pivotably mounted via an elastic bush on the vehicle body about a second predetermined pivot axis;
    said second lateral link having an opposite end pivotably mounted via an elastic bush on the vehicle body about a third predetermined pivot axis which lies substantially parallel to the vehicle longitudinal axis;
    a radius rod having one end movable with said wheel support and an opposite end pivotably mounted on the vehicle body about a fourth predetermined pivot axis, said radius rod extending generlly along the vehicle longitudinal axis;
    said second predetermined pivot axis being so inclined from the vehicle longitudinal axis as to provide an arrangement whereby when a force is applied to that portion of said first lateral link which is disposed near said opposite end of said first link in a direction along said second predetermined pivot axis, said first link moves transversely with respect to the vehicle longitudinal axis further than said second lateral link does, causing said first predetermined pivot axis to tilt and varying a toe angle of the road wheel; and
    means for applying force to said that portion of said first lateral link in at least said one direction.

2. An independent suspension system as claimed in claim 1, wherein said force applying means comprises an auxiliary link having one end connected to said radius rod and an opposite end connected to said that portion of said first link.

3. An independent suspension system as claimed in claim 2, wherein said one end of said auxiliary link is connected to that portion of said radius rod which is disposed near said opposite end of said radius rod.

4. An independent suspension system as claimed in claim 1, wherein said first lateral link is spaced from said second lateral link in a forward direction of the vehicle body along the vehicle longitudinal axis and said second predetermined pivot axis has a leading end and a trailing end which is disposed inboard of said leading end thereof.

5. An independent suspension system as claimed in claim 4, wherein said means includes an auxiliary link having one end connected to that portion of said radius rod which is disposed near said opposite end of said radius rod and an opposite end connected to said that portion of said first lateral link, said auxiliary link extending substantially along said second predetermined pivot axis.

6. An independent suspension system as claimed in claim 5, wherein said one end of said radius rod is connected to said one end of said first lateral link.

7. An independent suspension system as claimed in claim 5, wherein said one end of said radius rod is pivotably mounted on said wheel support.

8. An independent suspension system as claimed in claim 1, wherein said means comprises an actuator having a stationary part fixed to the vehicle body and a movable part connected to said that portion of said first lateral link, said movable part being movable relative to said stationary part substantially along said second predetermined pivot axis.

9. An independent suspension system as claimed in claim 8, wherein said means further comprises a control valve for controlling fluid supply to and fluid discharge from said actuator.

10. An independent suspension system as claimed in claim 3, wherein said means comprises an actuator having a stationary part fixed to the vehicle body and a movable part connected to said auxiliary link, said movable part being movable relative to said stationary part substantially along said second predetermined pivot axis.

11. An independent suspension system as claimed in claim 10, wherein said means further comprises a control valve for controlling fluid supply to and fluid discharge from said actuator.

12. An independent suspension system as claimed in claim 5, wherein said means comprises an actuator having a stationary part fixed to the vehicle body and a movable part connectd to said auxiliarly link, said movable part being movable relative to said stationary part substantially along said second predetermined pivot axis.

13. An independent suspension system as claimed in claim 12, wherein said means further comprises a control valve for controlling fluid supply to and fluid discharge from said actuator.

* * * * *